United States Patent
Deng et al.

(10) Patent No.: US 10,525,925 B2
(45) Date of Patent: Jan. 7, 2020

(54) DOOR ASSEMBLY

(71) Applicant: Ford Global Technologies, LLC, Dearborn, MI (US)

(72) Inventors: Zhibing Deng, Northville, MI (US); Krish E. Aekbote, Novi, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 102 days.

(21) Appl. No.: 15/726,930

(22) Filed: Oct. 6, 2017

(65) Prior Publication Data
US 2019/0106075 A1    Apr. 11, 2019

(51) Int. Cl.
| | |
|---|---|
| *B60R 21/21* | (2011.01) |
| *B60R 21/2165* | (2011.01) |
| *B60R 21/233* | (2006.01) |
| B60R 21/00 | (2006.01) |
| B60R 21/231 | (2011.01) |
| B60R 21/261 | (2011.01) |

(52) U.S. Cl.
CPC .......... *B60R 21/21* (2013.01); *B60R 21/2165* (2013.01); *B60R 21/233* (2013.01); *B60R 2021/0072* (2013.01); *B60R 2021/23107* (2013.01); *B60R 2021/2615* (2013.01)

(58) Field of Classification Search
CPC .............. B60R 21/21; B60R 21/2165; B60R 2021/0072; B60R 21/233; B60R 2021/2615; B60R 2021/23107; B60R 21/23138
See application file for complete search history.

(56) References Cited

U.S. PATENT DOCUMENTS

| | | | | |
|---|---|---|---|---|
| 4,043,572 | A * | 8/1977 | Hattori | B60R 21/30 137/844 |
| 5,072,966 | A * | 12/1991 | Nishitake | B60R 21/21 180/274 |
| 5,324,072 | A * | 6/1994 | Olson | B60R 21/23138 280/728.2 |
| 5,364,125 | A | 11/1994 | Brown et al. | |
| 5,722,685 | A | 3/1998 | Eyrainer | |
| 5,921,576 | A * | 7/1999 | Sinnhuber | B60R 21/21 280/728.2 |
| 5,979,932 | A * | 11/1999 | Jourdaine | B32B 17/10036 280/730.2 |

(Continued)

OTHER PUBLICATIONS

500sec.com article "Mercedes-Technolology-Airbag—Mercedes-500SEC-com," printed Jul. 14, 2017, http://500sec.com/airbag-belt-tensioner-and-beltbag/.

(Continued)

*Primary Examiner* — Frank B Vanaman
(74) *Attorney, Agent, or Firm* — Frank A. MacKenzie; Bejin Bieneman PLC

(57) ABSTRACT

A door assembly includes a door trim panel, a first airbag coupled to the door trim panel and inflatable to an inflated position, a second airbag coupled to the door trim panel and spaced in a vehicle-rearward direction from the first airbag and inflatable to an inflated position, and an inflator in simultaneous fluid communication with both the first and second airbags when the first and second airbags are in the inflated positions.

16 Claims, 7 Drawing Sheets

(56) References Cited

U.S. PATENT DOCUMENTS

| | | | |
|---|---|---|---|
| 6,065,771 A * | 5/2000 | Kawakubo | B29C 59/007 |
| | | | 280/728.3 |
| 6,508,486 B1 | 1/2003 | Welch et al. | |
| 6,851,706 B2 | 2/2005 | Roberts et al. | |
| 7,264,269 B2 | 9/2007 | Gu et al. | |
| 7,552,940 B2 | 6/2009 | Lindemann et al. | |
| 7,832,759 B2 | 11/2010 | Henricsson et al. | |
| 8,360,465 B1 * | 1/2013 | Nelson | B60R 21/26005 |
| | | | 280/730.2 |
| 8,636,301 B1 * | 1/2014 | Wang | B60R 21/232 |
| | | | 280/730.2 |
| 2001/0030415 A1 * | 10/2001 | Acker | B60R 21/23138 |
| | | | 280/730.2 |
| 2001/0042975 A1 * | 11/2001 | David | B60R 21/21 |
| | | | 280/730.2 |
| 2007/0046000 A1 * | 3/2007 | Sato | B60R 13/0243 |
| | | | 280/730.2 |
| 2007/0145726 A1 * | 6/2007 | Ochiai | B60R 21/232 |
| | | | 280/730.2 |
| 2007/0170705 A1 * | 7/2007 | Lindemann | B60R 21/21 |
| | | | 280/730.2 |
| 2013/0270805 A1 * | 10/2013 | Kruse | B60R 21/232 |
| | | | 280/730.2 |
| 2014/0265271 A1 * | 9/2014 | Dinsdale | B60R 21/23138 |
| | | | 280/730.2 |

OTHER PUBLICATIONS

Swedespeed.com article "Volvo Cars Airbag Celebrates 20 Years," printed Jul. 14, 2017, http://www.swedespeed.com/artman2/publish/Volvo_News/Volvo_Cars_Airbag_Celebrates_20_Years_1068.html, Source: Volvo Car Corporation dated May 23, 2007—7:36:00 PM.

* cited by examiner

DOOR ASSEMBLY

BACKGROUND

Vehicles may be subject to impact testing standards for airbags. As one example, the Insurance Institute for Highway Safety (IIHS) provides test procedures designed to simulate offset frontal collisions. One procedure provides that a test vehicle holding a test dummy as an occupant collides forward at 40 miles per hour with a five-foot-tall rigid barrier overlapping with 25% of the width of the vehicle on the driver side. As another example, the National Highway Traffic Safety Administration (NHTSA) provides a test procedure designed to simulate a vehicle experiencing a side collision with a pole. The NHTSA procedure provides that a test vehicle holding a test dummy as an occupant collides sideways at 20 miles per hour into a rigid vertical pole 10 inches in diameter.

DETAILED DESCRIPTION

Figure 1:
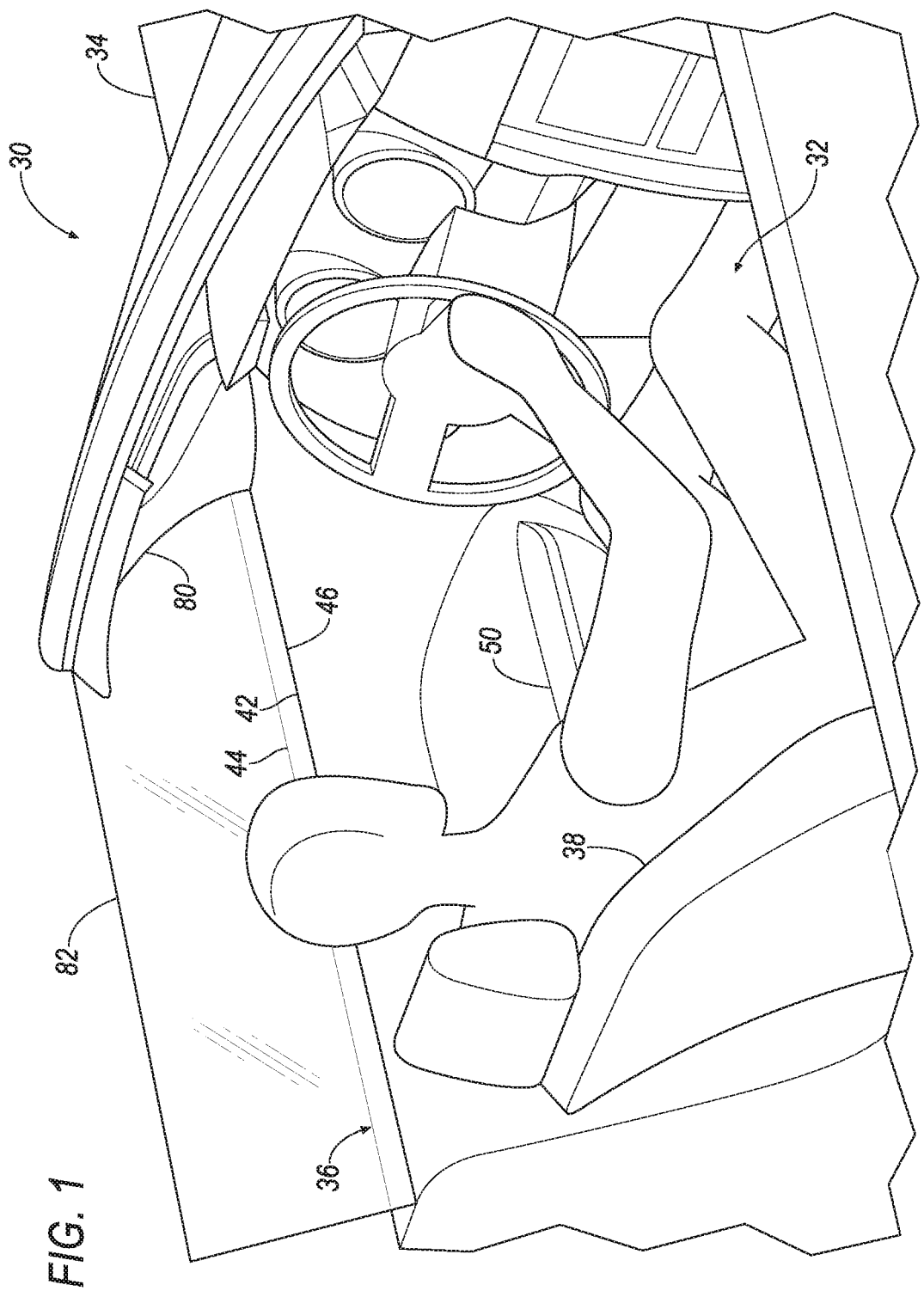
FIG. 1 is a perspective view of a portion of a passenger cabin of a vehicle with airbags in an uninflated position.

A door assembly includes a door trim panel, a first airbag coupled to the door trim panel and inflatable to an inflated position, a second airbag coupled to the door trim panel and spaced in a vehicle-rearward direction from the first airbag and inflatable to an inflated position, and an inflator in simultaneous fluid communication with both the first and second airbags when the first and second airbags are in the inflated positions.

The first and second airbags may be spaced from each other when in the inflated position.

The first and second airbags in the inflated position may extend upward from the door trim panel.

The first and second airbags in the inflated position may extend inboard from the door trim panel.

The first and second airbags may each be inflatable from an uninflated position to the inflated position, and the first and second airbags may be concealed by the door trim panel when in the uninflated position.

The door trim panel may include a seam that is frangible when pushed by one of the first and second airbags inflating. The door trim panel may include a breakaway panel positioned to be contacted by the first airbag when inflating, and the seam may define an edge of the breakaway panel. The seam may be a first seam, the breakaway panel may be a first breakaway panel, the door trim panel may include a second breakaway panel and a second seam that is frangible when pushed by one of the first and second airbags inflating, and the second seam may define an edge of the second breakaway panel. The second breakaway panel may be positioned to be contacted by the second airbag when inflating. The door trim panel may include a third seam that is frangible when pushed by one of the first and second airbags inflating, and the third seam may define an edge of the first breakaway panel and an edge of the second breakaway panel.

The door assembly may include a fill tube in fluid communication with the first airbag and with the second airbag. The inflator may be in fluid communication with the fill tube.

The first airbag in the inflated position may extend farther inboard than the second airbag in the inflated position.

The second airbag in the inflated position may extend farther upwards than the first airbag in the inflated position.

The second airbag in the inflated position may be wider in a vehicle-forward direction than the first airbag in the inflated position.

The door assembly may include a door panel coupled to the door trim panel. The first airbag and second airbag may be coupled to the door trim panel indirectly via the door panel.

A vehicle includes a door including a trim panel, a first airbag coupled to the trim panel and inflatable to an inflated position, a second airbag coupled to the trim panel and spaced from the first airbag and inflatable to an inflated position, and an inflator in fluid communication with both the first and second airbags when the first and second airbags are in the inflated positions.

The vehicle may be a convertible.

The vehicle may lack roof rails.

A door assembly 36 of a vehicle 30 includes a forward airbag 52 and a rearward airbag 54. The airbags 52, 54 may prevent a secondary impact between an occupant of the vehicle 30 and an A pillar 80 or a window 82 of the vehicle 30. Moreover, the airbags 52, 54 may provide a substitute for a side curtain airbag, allowing the airbags 52, 54 to be installed on a convertible vehicle. Furthermore, the airbags 52, 54 may have a smaller volume than a side curtain airbag and thus may be able to use an inflator 56 that is comparably smaller.

With reference to FIG. 1, the vehicle 30 includes a passenger cabin 32. The passenger cabin 32 houses occupants, if any, of the vehicle 30. The passenger cabin 32 may be surrounded and/or defined by a body 34 of the vehicle 30 and door assemblies 36 of the vehicle 30. The passenger cabin 32 includes one or more seats 38 for occupants of the vehicle 30. The seats 38 may be laterally aligned with the door assemblies 36, that is, the door assemblies 36 may be disposed in an outboard direction from the seats 38.

The vehicle 30 may be a convertible, that is, lack a fixed roof. The vehicle 30 may have, e.g., a retractable roof or a detachable roof (not shown). The vehicle 30 may lack roof rails, that is, no structure is attached rearward from a top of the A pillars 80.

Figure 3:
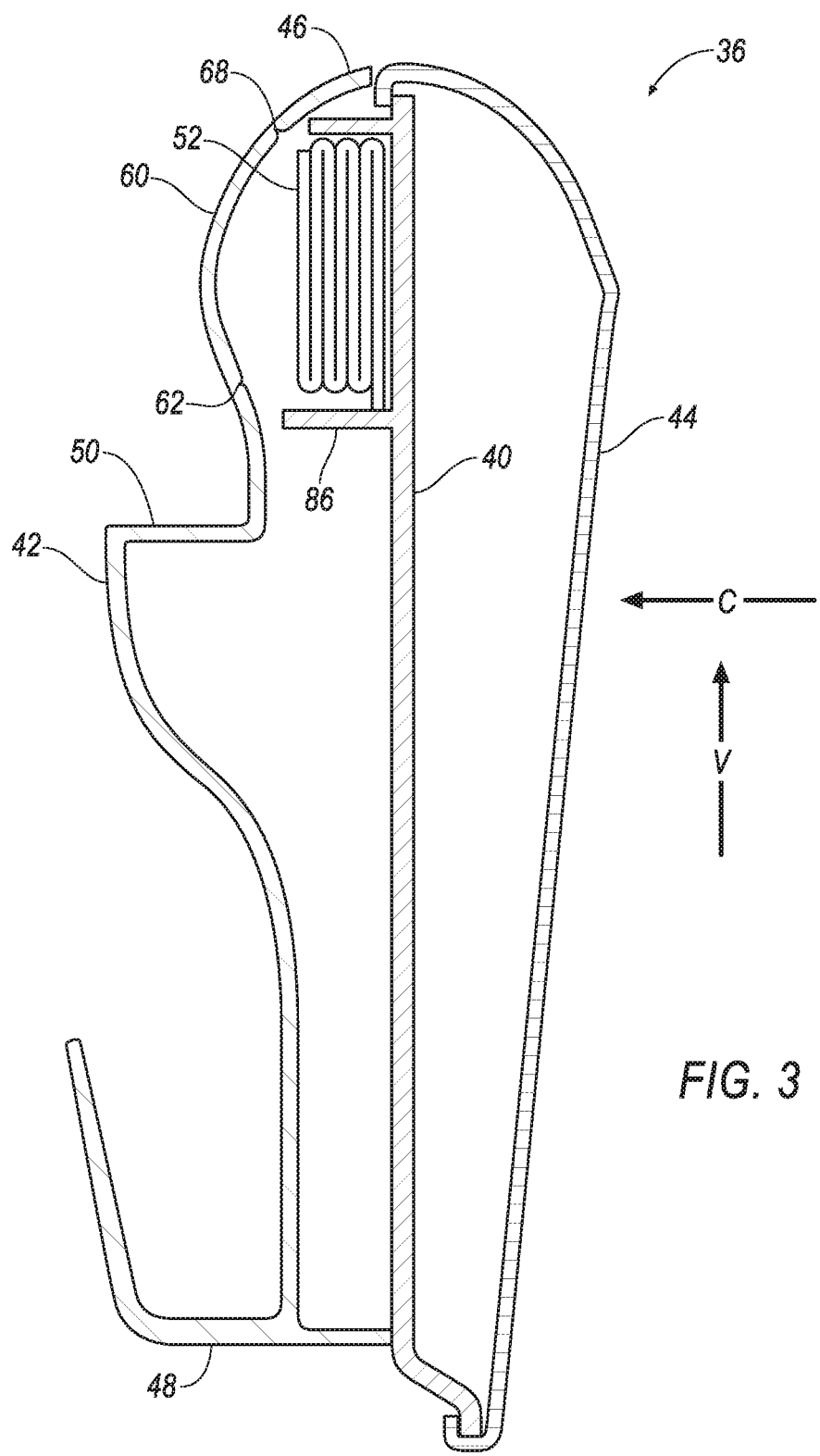
FIG. 3 is a cross-sectional view of the door assembly along line 3-3 in FIG. 2.
Figure 4:
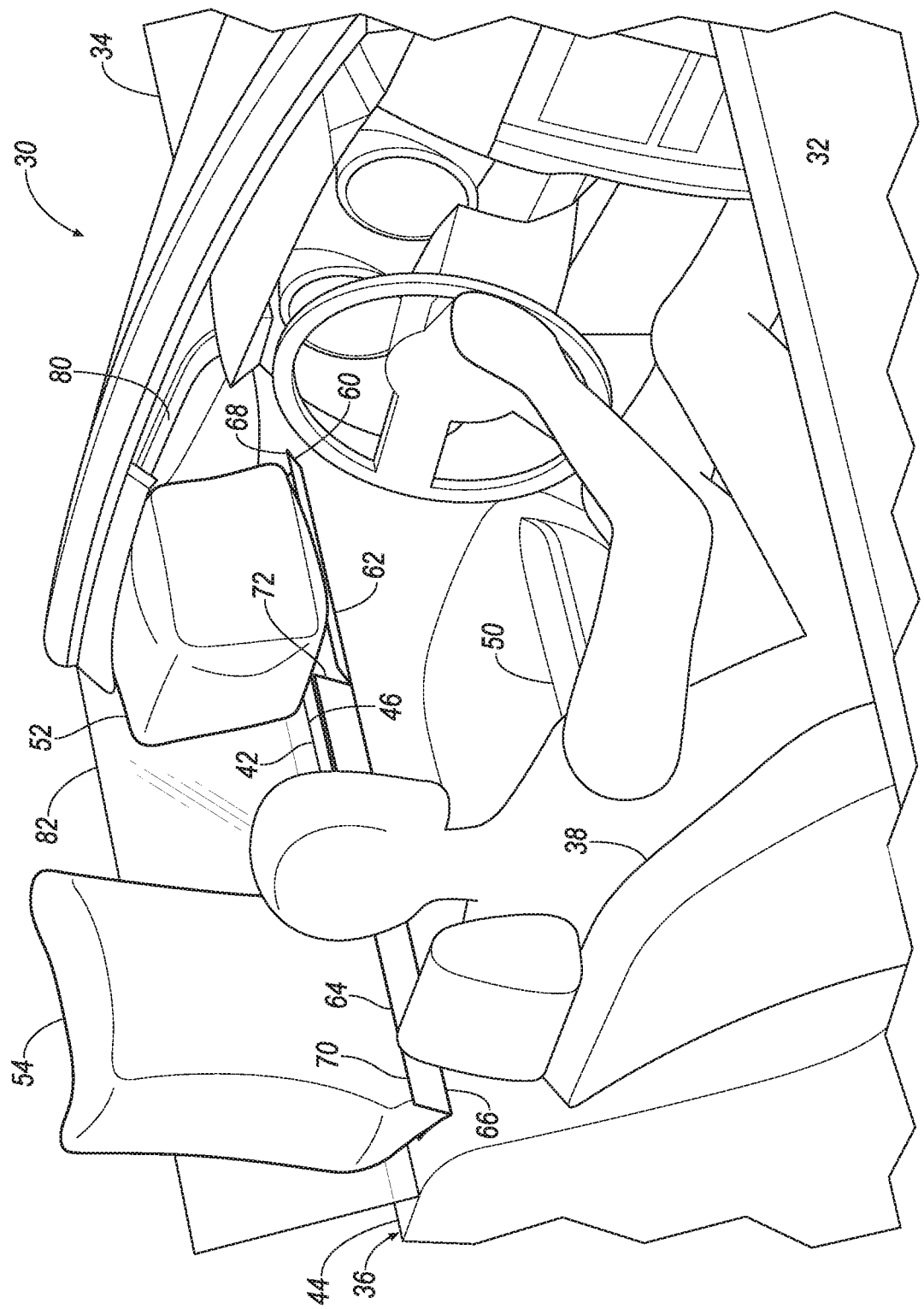
FIG. 4 is a perspective view of a portion of the passenger cabin of the vehicle with the airbags in an inflated position.

With reference to FIG. 3, for each door assembly 36, the door assembly 36 includes three door panels 40, 42, 44: a door inner 40, a door trim panel 42 fixed relative to the door inner 40, and a door outer 44 fixed relative to the door inner 40. The door trim panel 42 is fixed opposite the door outer 44 relative to the door inner 40. The door trim panel 42 is inboard relative to the door inner 40, and the door outer 44 is outboard relative to the door inner 40. The door outer 44 may be coupled to the door inner 40 in any suitably strong manner, e.g., fasteners, adhesive, crimping, clips, etc. The door trim panel 42 may be coupled to the door inner 40 in any suitably strong manner, e.g., fasteners, adhesive, crimping, clips, etc.

The door inner 40 may be formed of a metal such as steel or aluminum, a fiber reinforced plastic composite, etc., and provides structural rigidity for the door assembly 36. The door inner 40 may provide a mounting location for components of the door assembly 36 such as the windows 82 and apparatus for making the windows 82 slide up and down (not shown).

The door outer 44 faces outboard relative to the vehicle 30. The door outer 44 may present a class-A surface (not numbered), i.e., a surface specifically manufactured to have a high-quality, finished aesthetic appearance free of blemishes. The door outer 44 may be, for example, formed of steel, aluminum, fiber reinforced plastic composite, etc.

With reference to FIGS. 1-5, the door trim panel 42 may be formed of materials suitable for an interior of the vehicle 30, such as vinyl, plastic, leather, wood, etc. The door trim panel 42 may include an upper edge 46 defining a bottom of a window opening and a lower edge 48 defining a bottom of the door trim panel 42. The door trim panel 42 includes an armrest 50 disposed below the upper edge 46 and protruding inboard. The armrest 50 may be positioned at a height convenient for an occupant to access with his or her arm.

Figure 2:
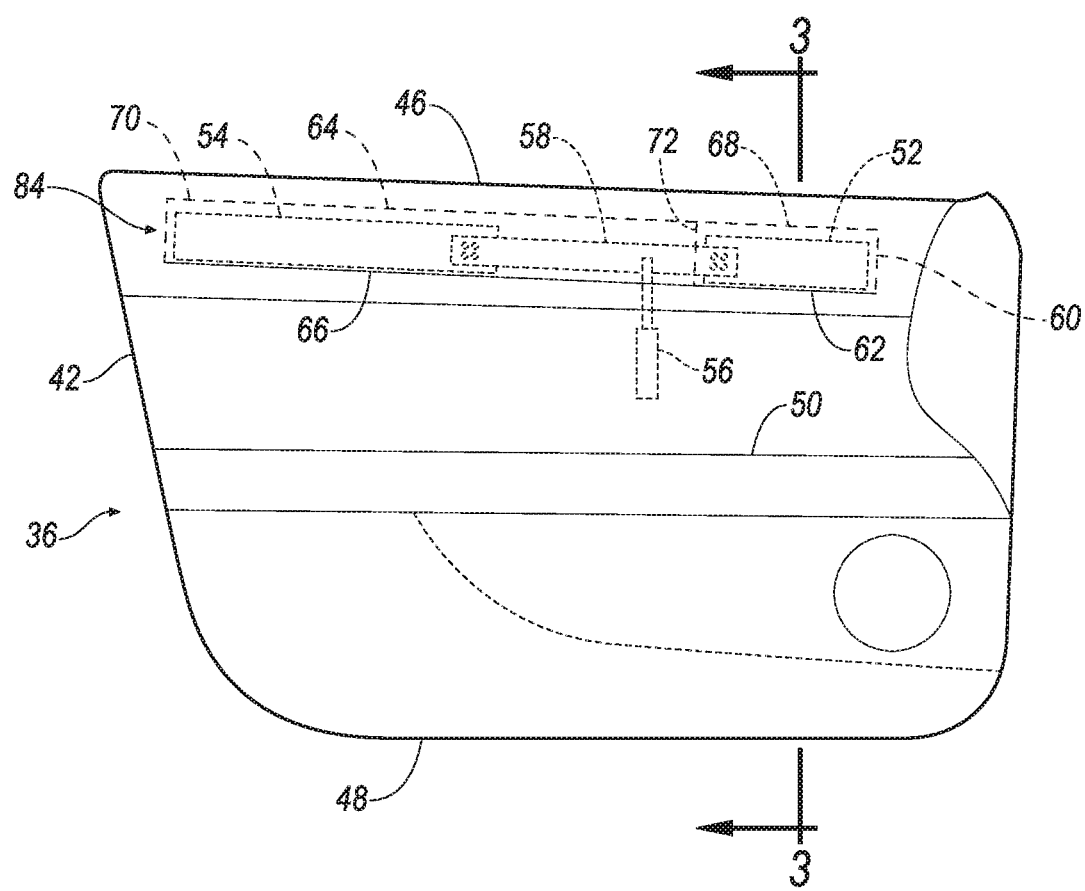
FIG. 2 is a side view of a door assembly of the vehicle with the airbags in the uninflated position.
Figure 5:
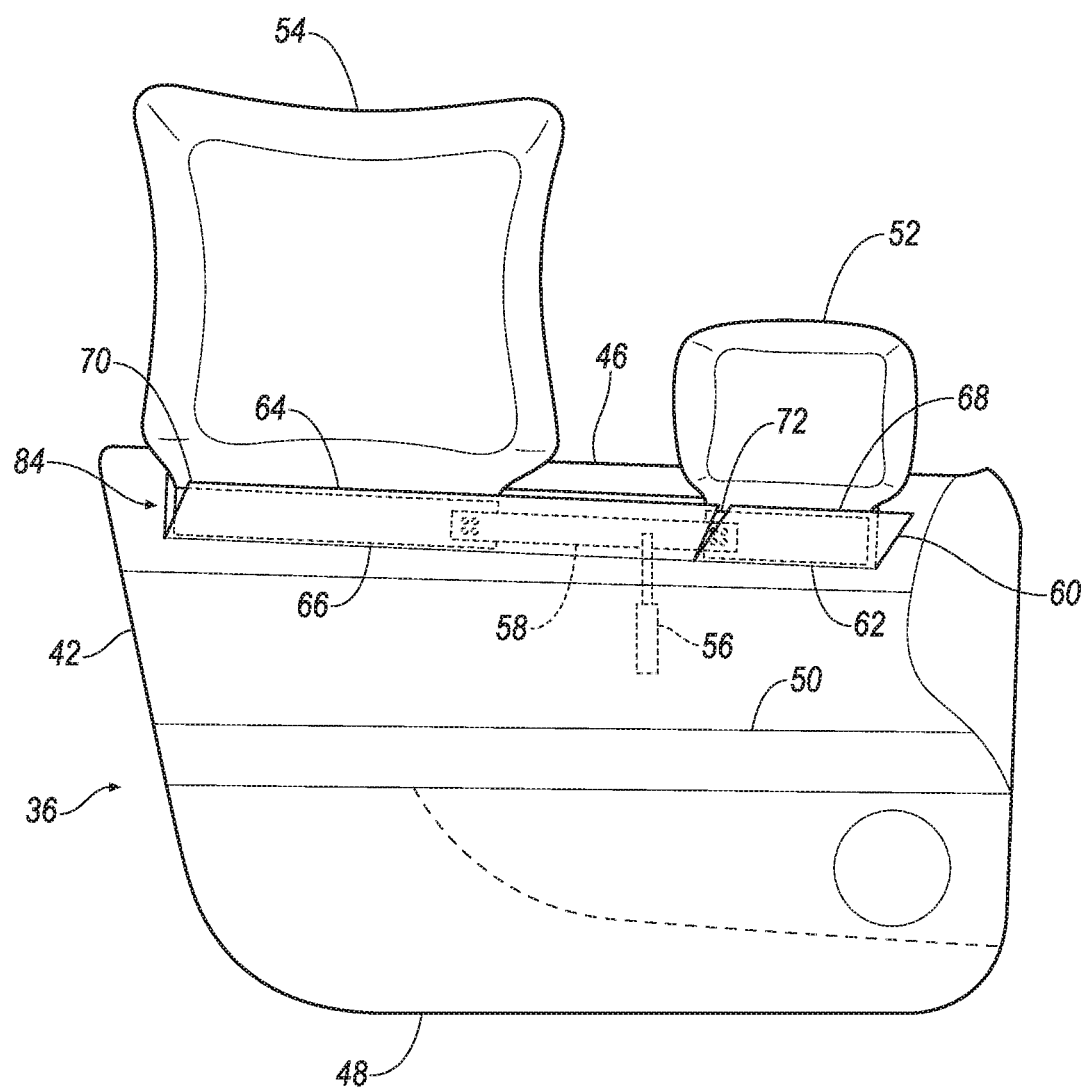
FIG. 5 is a side view of the door assembly of the vehicle with the airbags in the inflated position.
Figure 6:
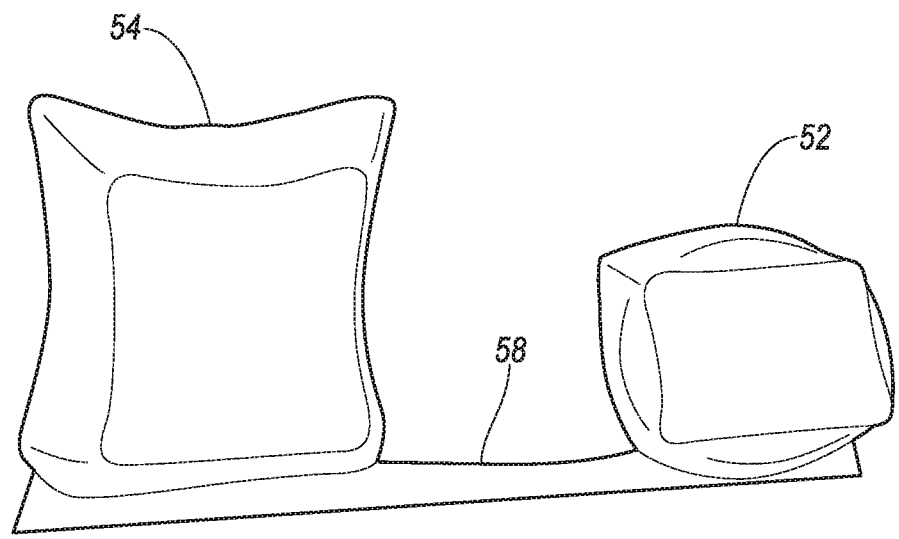
FIG. 6 is a side view of the airbags and a fill tube in the inflated position.
Figure 7:
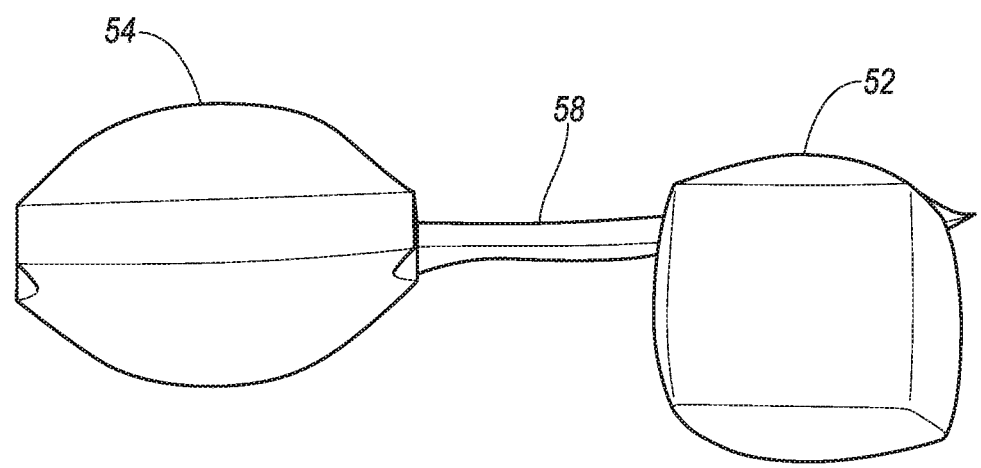
FIG. 7 is a top view of the airbags and the fill tube in the inflated position.
Figure 8:
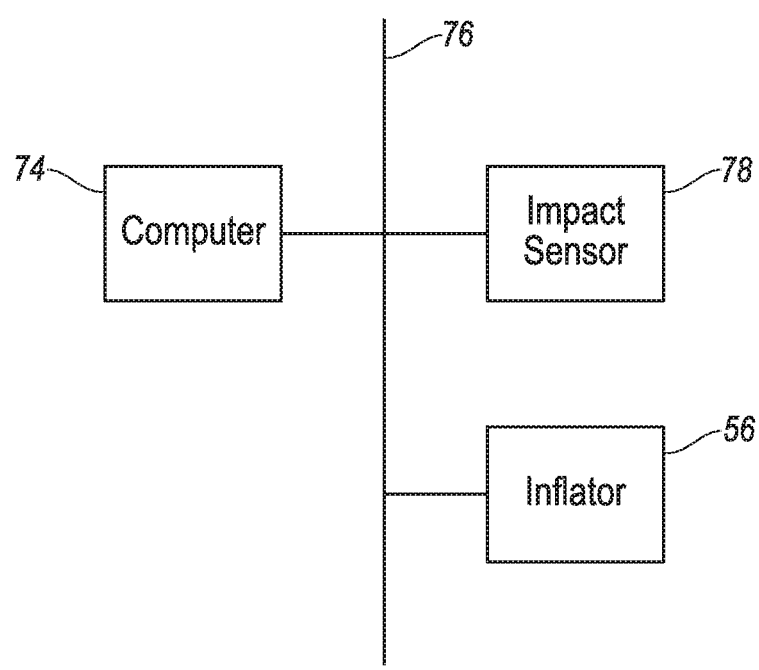
FIG. 8 is a block diagram of a control system for the airbags.

With reference to FIGS. 2, 3, and 5, the door assembly 36 includes an airbag assembly 84. The airbag assembly includes the forward airbag 52, the rearward airbag 54, housings 86, the inflator 56, and a fill tube 58.

With reference to FIG. 3, each of the housings 86 supports the forward airbag 52 or the rearward airbag 54. Each housing 86 may be a separate component attached to one of the door panels 40, 42, 44, or each housing 86 may be integral, i.e., is part of the same component as, one of the door panels 40, 42, 44, such as the door inner 40, as shown in FIG. 3.

With reference to FIGS. 2-7, the forward airbag 52 is coupled to the door trim panel 42. The forward airbag 52 may be coupled directly to the door trim panel 42 or coupled indirectly via the door inner 40 or the door outer 44. For example, the forward airbag 52 may be directly coupled to the door inner 40, which is directly coupled to the door trim panel 42. The forward airbag 52 may be coupled to the door inner 40 above the armrest 50. The forward airbag 52 may be coupled to the door inner 40 closer to the upper edge 46 of the door trim panel 42 than to the lower edge 48 of the door trim panel 42.

The forward airbag 52 is inflatable from an uninflated position to an inflated position. The forward airbag 52 in the uninflated position is concealed by the door trim panel 42. The forward airbag 52 in the uninflated position is disposed in one of the housings 86. The forward airbag 52 in the inflated position extends upward and inboard from the door trim panel 42.

The rearward airbag 54 is coupled to the door trim panel 42. The rearward airbag 54 may be coupled directly to the door trim panel 42 or coupled indirectly via the door inner 40 or the door outer 44. For example, the rearward airbag 54 may be directly coupled to the door inner 40, which is directly coupled to the door trim panel 42. The rearward airbag 54 may be coupled to the door inner 40 above the armrest 50. The rearward airbag 54 may be coupled to the door inner 40 closer to the upper edge 46 of the door trim panel 42 than to the lower edge 48 of the door trim panel 42. The rearward airbag 54 may be coupled to the door inner 40 at substantially the same height as the forward airbag 52 is coupled to the door inner 40.

The rearward airbag 54 is inflatable from an uninflated position to an inflated position. The rearward airbag 54 in the uninflated position is concealed by the door trim panel 42. The rearward airbag 54 in the uninflated position is disposed in one of the housings 86. The rearward airbag 54 in the inflated position extends upward and inboard from the door trim panel 42. The forward airbag 52 and the rearward airbag 54 are spaced from each other when in the inflated position and when in the uninflated position. The rearward airbag 54 is spaced in a vehicle-rearward direction from the forward airbag 52.

The forward airbag 52 in the inflated position extends farther inboard, that is, toward a centerline of the vehicle 30, than the rearward airbag 54 in the inflated position. The rearward airbag 54 in the inflated position extends farther upward, that is, in a vehicle-upward direction, than the forward airbag 52 in the inflated position. The rearward airbag 54 in the inflated position is wider in a vehicle-forward direction than the forward airbag 52 in the inflated position.

The airbags 52, 54 may be formed of any suitable airbag material, for example, a woven polymer. For example, the airbags 52, 54 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIGS. 2, 3, 5, and 8, the inflator 56 may be connected to the airbags 52, 54. Upon receiving a signal from, e.g., a controller, the inflator 56 may inflate the airbags 52, 54 with an inflatable medium, such as a gas. The inflator 56 may be, for example, a pyrotechnic inflator that uses a chemical reaction to drive inflation medium to the airbag. The inflator 56 may be of any suitable type, for example, a cold-gas inflator.

With reference to FIGS. 2, 3, and 5-7, a fill tube 58 is in fluid communication with the forward airbag 52, the rearward airbag 54, and the inflator 56. The fill tube 58 is unobstructed, so the forward airbag 52, the rearward airbag 54, and the inflator 56 are in fluid communication with each other at all times. For the purposes of this disclosure, "fluid communication" between A and B means that fluid is free to flow from whichever of A and B has higher pressure to whichever of A and B has lower pressure. The fill tube 58 may be made of the same material as the airbags 52, 54 or a different material.

Thus, the forward airbag 52 and the rearward airbag 54 are simultaneously inflatable by the inflator 56. The inflator 56 is in simultaneous fluid communication with both the forward airbag 52 and the rearward airbag 54 when the airbags 52, 54 are in the inflated position and when the airbags 52, 54 are in the uninflated position.

The door trim panel 42 includes a forward breakaway panel 60 positioned to be contacted by the forward airbag 52 when inflating. The forward breakaway panel 60 is designed to open at a force threshold that is less than the force of the forward airbag 52 inflating. The forward breakaway may open by rotating inboard about a forward hinge 62. The appearance of the forward breakaway panel 60 may be hidden or obscured on an inboard side of the door trim panel 42; that is, an occupant may not see the forward breakaway panel 60 as a particular component of the door trim panel 42.

The door trim panel 42 includes a rearward breakaway panel 64 positioned to be contacted by the rearward airbag 54 when inflating. The rearward breakaway panel 64 is designed to open at a force threshold that is below the force of the rearward airbag 54 inflating. The rearward breakaway may open by rotating inboard about a rearward hinge 66. The appearance of the rearward breakaway panel 64 may be hidden or obscured on an inboard side of the door trim panel 42; that is, an occupant may not see the rearward breakaway panel 64 as a particular component of the door trim panel 42. The rearward breakaway panel 64 may be adjacent to the forward breakaway panel 60. The forward breakaway panel 60 and the rearward breakaway panel 64 may be separately openable.

A forward seam 68 defines an edge of the forward breakaway panel 60, and a rearward seam 70 defines an edge of the rearward breakaway panel 64. A middle seam 72 may define an edge of the forward breakaway panel 60 and an edge of the rearward breakaway panel 64. The forward seam 68, the middle seam 72, and the forward hinge 62 may circumscribe the forward breakaway panel 60. The forward seam 68 may extend along a forward edge and an upward edge of the forward breakaway panel 60. The middle seam 72 may extend along a rearward edge of the forward breakaway panel 60. The forward hinge 62 may extend along a lower edge of the forward breakaway panel 60. The rearward seam 70, the middle seam 72, and the rearward hinge 66 may circumscribe the rearward breakaway panel 64. The rearward seam 70 may extend along an upward edge and a rearward edge of the rearward breakaway panel 64. The middle seam 72 may extend along a forward edge of the rearward breakaway panel 64. The rearward hinge 66 may extend along a lower edge of the rearward breakaway panel 64.

The forward seam 68, the rearward seam 70, and the middle seam 72 are frangible when pushed by either the forward airbag 52 or the rearward airbag 54 inflating; in other words, the force of inflation of the forward airbag 52 or the rearward airbag 54 is sufficient to break the forward seam 68, the rearward seam 70, and the middle seam 72. The forward seam 68, the rearward seam 70, and the middle seam 72 may be portions of the door trim panel 42 that are thinner than the rest of the door trim panel 42, as seen in FIG. 3. The forward hinge 62 and the rearward hinge 66 may be less frangible than the seams 68, 70, 72; that is, a higher force is needed to break the hinges 62, 66 than to break the seams 68, 70, 72. The hinges 62, 66 may be portions of the door trim panel 42 that are thicker than the seams 68, 70, 72 and thinner than the rest of the door trim panel 42, as seen in FIG. 3.

The computer 74 is a microprocessor-based controller. The computer 74 may include a processor, memory, etc. The memory of the computer 74 may include memory for storing instructions executable by the processor as well as for electronically storing data and/or databases. The computer 74 may be a restraint control module, i.e., may be in communication with and may control seatbelt pretensioners, airbags in the vehicle 30 besides the forward airbag 52 and the rearward airbag 54, etc., among other functions.

The computer 74 may transmit and receive data through a communications network 76 such as a controller area network (CAN) bus, Ethernet, WiFi, Local Interconnect Network (LIN), onboard diagnostics connector (OBD-II), and/or by any other wired or wireless communications network. The computer 74 may be in communication with the inflator 56 and an impact sensor 78 via the communications network 76.

The impact sensor 78 is adapted to detect an impact to the vehicle 30. The impact sensor 78 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 78 may be located at numerous points in or on the vehicle 30.

In the event of an impact, the impact sensor 78 may detect the impact and transmit a signal through the communications network 76 to the computer 74. The computer 74 may be programmed to instruct the inflator 56 to inflate in response to the signal from the impact sensor 78 indicating an impact or in response to the signal from the impact sensor 78 indicating an oblique or side impact. The computer 74 may transmit a signal through the communications network 76 to the inflator 56. The inflator 56 may discharge and inflate the forward airbag 52 and the rearward airbag 54 simultaneously through the fill tube 58. The forward airbag 52 may push against the forward breakaway panel 60, break the forward seam 68 and the middle seam 72, and bend the forward hinge 62. The forward breakaway panel 60 may open inboard. The rearward airbag 54 may push against the forward breakaway panel 60, break the rearward seam 70 and the middle seam 72, and bend the rearward hinge 66. The rearward breakaway panel 64 may open inboard. The forward breakaway panel 60 may open farther inboard than the rearward breakaway panel 64 because the forward airbag 52 extends farther inboard than the rearward airbag 54 in the inflated position. The forward airbag 52 and the rearward airbag 54 may cushion the occupant of the vehicle 30 during the impact and may reduce injuries to the occupant.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A door assembly comprising:
    a door trim panel;
    a first airbag coupled to the door trim panel and inflatable to an inflated position;
    a second airbag coupled to the door trim panel and spaced in a vehicle-rearward direction from the first airbag and inflatable to an inflated position; and
    an inflator in simultaneous fluid communication with both the first and second airbags when the first and second airbags are in the inflated positions;
    wherein the first airbag in the inflated position extends farther inboard than the second airbag in the inflated position;
    the door trim panel includes a first seam and a second seam that are each frangible when pushed by one of the first and second airbags inflating;
    the door trim panel includes a first breakaway panel positioned to be contacted by the first airbag when inflating, and the first seam defines an edge of the breakaway panel; and
    the door trim panel includes a second breakaway panel, and the second seam defines an edge of the second breakaway panel.

2. The door assembly of claim 1, wherein the first and second airbags are spaced from each other when in the inflated position.

3. The door assembly of claim 1, wherein the first and second airbags in the inflated position extend upward from the door trim panel.

4. The door assembly of claim 1, wherein the first and second airbags in the inflated position extend inboard from the door trim panel.

5. The door assembly of claim 1, wherein the first and second airbags are each inflatable from an uninflated position to the inflated position, and the first and second airbags are concealed by the door trim panel when in the uninflated position.

6. The door assembly of claim 1, wherein the second breakaway panel is positioned to be contacted by the second airbag when inflating.

7. The door assembly of claim 1, wherein the door trim panel includes a third seam that is frangible when pushed by one of the first and second airbags inflating, and the third seam defines an edge of the first breakaway panel and an edge of the second breakaway panel.

8. The door assembly of claim 1, further comprising a fill tube in fluid communication with the first airbag and with the second airbag.

9. The door assembly of claim 8, wherein the inflator is in fluid communication with the fill tube.

10. The door assembly of claim 1, wherein the second airbag in the inflated position extends farther upwards than the first airbag in the inflated position.

11. The door assembly of claim 1, wherein the second airbag in the inflated position is wider in a vehicle-forward direction than the first airbag in the inflated position.

12. The door assembly of claim 1, further comprising a door panel coupled to the door trim panel.

13. The door assembly of claim 12, wherein the first airbag and second airbag are coupled to the door trim panel indirectly via the door panel.

14. A vehicle comprising:
a door including a trim panel;
a first airbag coupled to the trim panel and inflatable to an inflated position;
a second airbag coupled to the trim panel and spaced in a vehicle-rearward direction from the first airbag and inflatable to an inflated position; and
an inflator in fluid communication with both the first and second airbags when the first and second airbags are in the inflated positions;
wherein the first airbag in the inflated position extends farther inboard than the second airbag in the inflated position;
the door trim panel includes a first seam and a second seam that are each frangible when pushed by one of the first and second airbags inflating;
the door trim panel includes a first breakaway panel positioned to be contacted by the first airbag when inflating, and the first seam defines an edge of the breakaway panel; and
the door trim panel includes a second breakaway panel, and the second seam defines an edge of the second breakaway panel.

15. The vehicle of claim 14, wherein the vehicle is a convertible.

16. The vehicle of claim 14, wherein the vehicle lacks roof rails.

* * * * *